(12) United States Patent
Boesveld et al.

(10) Patent No.: US 9,678,518 B2
(45) Date of Patent: Jun. 13, 2017

(54) REMOTE MAINTENANCE

(71) Applicant: Robert Bosch GmbH, Stuttgart (DE)

(72) Inventors: Willem Hendrik Boesveld, PG De Vecht (NL); Hendrik Johannes Kalk, Deventer (NL)

(73) Assignee: Robert Bosch GmbH, Stuttgart (DE)

( * ) Notice: Subject to any disclaimer, the term of this patent is extended or adjusted under 35 U.S.C. 154(b) by 511 days.

(21) Appl. No.: 14/256,523

(22) Filed: Apr. 18, 2014

(65) Prior Publication Data
US 2014/0316585 A1 Oct. 23, 2014

(30) Foreign Application Priority Data
Apr. 18, 2013 (NL) ..................................... 2010662

(51) Int. Cl.
*G05D 23/19* (2006.01)
*F24F 11/00* (2006.01)

(52) U.S. Cl.
CPC ...... *G05D 23/1934* (2013.01); *F24F 11/0012* (2013.01); *G05D 23/1902* (2013.01); *F24F 2011/0068* (2013.01); *F24F 2221/52* (2013.01)

(58) Field of Classification Search
None
See application file for complete search history.

(56) References Cited

U.S. PATENT DOCUMENTS

| | | | |
|---|---|---|---|
| 6,717,513 B1* | 4/2004 | Sandelman | F24F 11/0086 340/3.1 |
| 6,868,293 B1* | 3/2005 | Schurr | G05D 23/1905 323/211 |
| 7,092,794 B1* | 8/2006 | Hill | G08C 17/02 700/108 |
| 8,594,850 B1* | 11/2013 | Gourlay | G05B 15/02 165/11.1 |
| 9,098,279 B2* | 8/2015 | Mucignat | H04L 12/2825 |
| 2005/0103874 A1* | 5/2005 | Erdman, Jr. | F24F 11/0086 236/51 |
| 2005/0125102 A1 | 6/2005 | Nicholas et al. | |
| 2006/0283965 A1* | 12/2006 | Mueller | F24F 11/0012 236/51 |
| 2007/0228183 A1* | 10/2007 | Kennedy | F24F 11/0012 236/1 C |
| 2009/0057428 A1* | 3/2009 | Geadelmann | G05B 15/02 236/51 |

(Continued)

*Primary Examiner* — Isaac T Tecklu
(74) *Attorney, Agent, or Firm* — Gerard Messina

(57) ABSTRACT

The invention relates to a thermostat for communicating with a remote maintenance server. The thermostat being configured for receiving and sending network data from and to the remote maintenance server. The thermostat is configured to receive network data provided by a maintenance interface service for receiving and displaying network data from and to a maintenance person. The thermostat is configured for receiving and sending remote controller data from and to a remote controller. The thermostat is configured to receive remote controller data from a user through a controller user interface. The thermostat is configured for receiving and sending appliance data from and to at least one appliance. The thermostat is configured for generating a request for appliance data from the at least one appliance and the thermostat is configured for receiving appliance data in response to the request for appliance data.

25 Claims, 7 Drawing Sheets

(56) References Cited

U.S. PATENT DOCUMENTS

| | | | |
|---|---|---|---|
| 2009/0099699 A1* | 4/2009 | Steinberg | F24F 11/006 700/278 |
| 2010/0308119 A1* | 12/2010 | Steinberg | G05B 19/0426 236/51 |
| 2012/0061480 A1* | 3/2012 | Deligiannis | F24F 11/0012 236/51 |
| 2012/0191257 A1* | 7/2012 | Corcoran | H04L 12/2818 700/278 |
| 2012/0221150 A1* | 8/2012 | Arensmeier | G05B 23/0224 700/276 |
| 2012/0233478 A1* | 9/2012 | Mucignat | H04L 12/2825 713/320 |
| 2012/0256009 A1* | 10/2012 | Mucignat | G05D 23/1905 236/1 C |
| 2012/0298763 A1* | 11/2012 | Young | G05D 23/1905 236/51 |
| 2013/0006400 A1* | 1/2013 | Caceres | H04L 12/2803 700/90 |
| 2013/0024799 A1 | 1/2013 | Fadell et al. | |
| 2013/0090767 A1* | 4/2013 | Bruck | F24F 11/0086 700/276 |
| 2014/0156087 A1* | 6/2014 | Amundson | G05B 15/02 700/278 |

* cited by examiner

REMOTE MAINTENANCE

RELATED APPLICATION INFORMATION

The present application claims priority to and the benefit of Netherlands patent application no. 2 010 662, which was filed in the Netherlands on Apr. 18, 2013, the disclosure of which is incorporated herein by reference.

The invention relates to a thermostat configured for communicating with a remote maintenance server.

Thermostats that communicate with a remote maintenance server are known. For example, thermostats communicate with a remote maintenance server through the Internet.

The remote maintenance server usually provides directly or indirectly services to the thermostat. For example, the remote maintenance server allows a maintenance person to access a status of the thermostat. In case of errors or defects of the thermostat, the maintenance person may propose solutions to overcome these errors and defects.

Thermostats may be used for control of an appliance. The appliance may for example be a domestic heating device of a domestic heating system such as a central heating system, for providing heated liquid medium to a radiator of the heating system and/or providing heated tap water. In particular, domestic heating devices are part of a central heating system in buildings, for example houses. The heated liquid medium is supplied to a radiator, such as a wall-mounted panel, for heating the building and/or for providing heated tap water.

The appliance may be any heating, ventilation and air conditioning (HVAC) system.

Thermostats that are able to communicate with a remote maintenance server are originally being implemented for allowing the maintenance person to access the appliance from a distance. This may remove the necessity for the maintenance person to physically access the appliance for a correct functioning.

The invention aims to provide an improved thermostat that communicates with a remote maintenance server.

In order to achieve this goal, according to a first aspect of the invention, there is provided a thermostat for communicating with a remote maintenance server. The thermostat is configured for receiving and sending network data from and to the remote maintenance server. The thermostat, for example is configured to communicate by means of internet with the remote maintenance server. The thermostat may be located in a domestic enclosure, such as a house. The remote maintenance server may be located remotely from the domestic enclosure.

In particular, the remote maintenance server is configured for receiving and sending the network data from and to the thermostat.

The remote maintenance server preferably is a message distribution centre, e.g. an Extensible Messaging and Presence (XMPP) server. These types of servers allow data to be distributed via the XMPP protocol from one entity to another. For example, network data from the thermostat is sent via the remote maintenance server to another server or service.

The thermostat is further configured to receive network data from a maintenance interface service. The maintenance interface service is suitable for receiving and displaying network data from and to a maintenance person. The maintenance interface service may be provided on a dedicated server or may be provided in the cloud.

Preferably, the thermostat communicates with the remote maintenance server through the message distribution centre.

This has as advantage that the maintenance interface service may be provided at any location with respect to the thermostat as long as it is able to contact the message distribution centre. A further example is that it allows providing multiple maintenance interface services easily.

The maintenance person may for example enter network data via the maintenance interface service to the thermostat. The maintenance person may be able to read network data from the maintenance interface service, which for this purpose may comprise a display.

The thermostat is further configured for receiving and sending remote controller data from and to a remote controller. In particular, the remote controller is configured for receiving and sending the remote controller data from and to the thermostat.

The thermostat is configured to receive remote controller data from a user through the controller user interface. In particular, the remote controller comprises a controller user interface for receiving and displaying remote controller data from and to the user.

The remote controller may for example be a mobile smartphone that is able to run apps. For example, the mobile smartphone is an iPhone able to run Apple apps, or it may for example be an Android phone able to run Android apps, or it may be a Windows 8 phone able to run Windows apps. In another example, the remote controller is a Smart TV or a web page, or any other means that is able to interface remote controller data remotely with the user.

In particular, the remote controller may be configured for receiving and sending the remote controller data by means of an app running on the remote controller. This may allow for an easy and cheap controller user interface as it may allow the user to run the app on an conventional smartphone. This allows the user to read remote controller data from the app displayed on the mobile smartphone and allows the user to enter remote controller data on the mobile smartphone.

The thermostat is further configured for receiving and sending appliance data from and to at least one appliance. In particular, the at least one appliance is configured for receiving and sending appliance data from and to the thermostat.

The appliance preferably is a domestic heating device such as a central heating system for providing heated liquid medium to a radiator and/or a tap.

In another example, the appliance is an air conditioning unit.

In another example, the appliance is a ventilation unit.

The thermostat is configured for generating a request for appliance data from the at least one appliance. In particular, the appliance is configured for sending appliance data to the thermostat in response to the request for appliance data. The thermostat is configured for receiving appliance data in response to the request for appliance data.

This has as advantage that the thermostat user and/or the maintenance person is able to see appliance data upon request. The user may for example generate the request for appliance data through the remote controller by means of the controller user interface. The thermostat sends, or redirects, this request to the at least one appliance. Upon receiving this request the at least one appliance sends the appliance data to the thermostat. Having the requested appliance data in the thermostat allows an easy access of this appliance data by the user and/or the maintenance person. For example, the appliance data is send to the remote controller and/or the remote maintenance server. This results in an improved thermostat in which the user and/or the maintenance person are able to request appliance data and see the requested appliance data. It allows the maintenance person to see that the user has requested appliance data and also allows an overview of which appliance data was requested. Vice versa, it allows the user to see that the maintenance person has requested appliance data and allows an overview of which appliance data was requested.

In another example, the maintenance person generates the request for appliance data through the remote maintenance server by means of the maintenance interface service. Again, the thermostat sends, or redirects, this request to the at least one appliance. Upon receiving this request the at least one appliance sends the appliance data to the thermostat. Having the requested appliance data in the thermostat allows an easy access of this appliance data by the user and/or the maintenance person. For example, the appliance data is send to the remote controller and/or the remote maintenance server.

In particular, all data can be incorporated in other data. E.g. appliance data can be incorporated into remote controller data and/or network data and vice versa. The prefix "appliance", "remote controller" and "network" data is merely to indicate between which entities data is transferred. Appliance data is transferred between the at least one appliance and the thermostat. Remote controller data is transferred between the remote controller and the thermostat. Network data is transferred between the remote maintenance server and the thermostat.

Preferably, the requested appliance data is representative for a status of the appliance. For example, the appliance data is representative for energy consumption and/or life time of the appliance and/or life time of any components of the appliance. For example, the appliance data is representative for:
  burner modulation;
  burner on/off time;
  heating medium inlet temperature;
  heating medium outlet temperature;
  heating medium pump speed;
  enclosure outside temperature;
  enclosure inside temperature;
  water pressure;
  thermostat temperature set point;
  appliance operation status/modus.

For example, the appliance operation status/modus is representative for the status of the appliance, e.g. a boiler. The status for example is one of the following: "service maintenance", "error", "locked", "blocked" or "stand-by" which is respectively corresponding to the appliance being in service maintenance mode, error mode, locked mode, blocked mode or stand-by mode.

The invention, according to the first aspect, may also relate to a thermostat system comprising a thermostat according to any embodiment and the remote controller and/or the remote maintenance server and/or the at least one appliance.

Preventive Maintenance

In an embodiment, according to a second aspect of the invention, the thermostat is further configured for storing the appliance data over time and for predicting an appliance error by comparing the stored appliance data over time with reference appliance data.

This allows a servicing and/or maintenance before an actual appliance error occurs. The user and/or the maintenance person can be warned whether the at least one appliance needs servicing and/or maintenance.

In a further embodiment, the thermostat is configured for receiving reference appliance data from the remote maintenance server and/or the thermostat and/or the remote controller.

Preferably, the thermostat is configured for receiving the reference appliance data from the remote maintenance server. In a further preference, the remote maintenance server comprises a message distribution centre, e.g. an XMPP server that only relays data. Reference appliance data is hosted on another server, e.g. a dedicated server or in the cloud. This other server forms part of the remote maintenance server.

Servicing of an appliance requires involvement of an appliance expert such as the maintenance person. For example, replacing components of the appliance and/or repairing the appliance.

Maintenance does not require involvement of the appliance expert. The user is able and allowed to maintain the appliance himself. For example, in case the appliance is a boiler, maintenance relates to filling a water level of the boiler.

Although, this difference exists between servicing and maintenance, both meanings can be interchanged.

Instead of notifying afterwards that an appliance error has occurred in the at least one appliance, the thermostat generates a prediction of an appliance error prior to the occurrence of the appliance error. This allows the maintenance person to perform preventive maintenance and/or servicing and allows the user to see which components need to be serviced and/or maintained in the future. This results in an improved thermostat more comfort for the user and an increment of reliability of the heating system. Moreover, it allows the maintenance person to plan a service before there is an acute error.

In an embodiment the appliance data over time is stored within the thermostat and/or the remote maintenance server and/or the remote controller. The appliance data is stored in e.g. in a memory unit in the thermostat or the remote controller. Or the appliance data is stored in a memory service in the remote maintenance server.

When the appliance data is stored in the remote maintenance server, the appliance data is comprised in the network data sent to the remote maintenance server.

In this embodiment the remote maintenance server preferably comprises the message distribution centre, e.g. the XMPP server. Appliance data is sent from the thermostat to the XMPP server. The XMPP server relays the appliance data to storage, e.g. a database. The storage may be a storage service running on a dedicated server, or may be a storage service running in the cloud.

When the appliance data is stored in the remote controller, the appliance data is comprised in the remote controller data sent to the remote controller.

Storing appliance data within the thermostat and/or the remote maintenance server and/or the remote controller has as advantage that appliance data over time can be stored safely and backups may be provided.

In an embodiment, the stored appliance data over time is compared with reference appliance data stored in a database provided by the thermostat and/or the remote maintenance server and/or the remote controller.

Preferably, the appliance data is stored in the remote maintenance server, wherein the remote maintenance server comprises a message distribution centre, e.g. an XMPP server.

In an embodiment, the database comprising reference appliance data relating to (components of) the appliance is updated and/or filled.

In an embodiment, the database comprising reference appliance data is updated and/or filled by the maintenance person. The maintenance person updates the database based on real-life experience, skills, practice and routine.

For example, when the maintenance person know from experience that a certain type of appliance requires a certain maintenance or service at a certain time, the maintenance person can enter this into the database such that it becomes reference appliance data.

In an embodiment, the database comprising reference appliance data is updated and/or filled based on factory settings specified by a manufacturer of the appliance. The remote maintenance person may enter these factory settings in the database and/or the database is automatically filled by means of a dedicated service.

For example, when a manufacturer of an appliance specifies that a certain component, such as a burner has a life time of a certain amount of years, this factory setting can be entered in the database as reference appliance data.

In an embodiment, the database comprising reference appliance data is updated and/or filled based on experience of other users.

Preferably, the database is provided by the remote maintenance server and the remote maintenance server receives actual failure time from multiple appliances through one or more thermostats. Based on the received actual failure times for the same type of component in an appliance the maximum use time of this component can be updated.

This has as advantage that a more accurate prediction of an appliance error can be made.

Preferably, the database is provided by the remote maintenance server with which other thermostats can communicate. For example, the remote maintenance server comprises a message distribution centre, e.g. an XMPP centre, that provides access to a database service. Multiple thermostats are able to communicate with the database service. The database service updates the database based on received appliance data from all the connected thermostats. The database service for example calculates an average end of life of components of an appliance based on all received appliance data. This average end of life is stored as reference appliance data in the database service, which in turn is accessible by all the thermostats.

In a further embodiment, the stored appliance data is representative for a current status of a component of the appliance and the database comprises reference appliance data representative for a specification of the component of the appliance.

This has as advantage that multiple recorded current statuses of an component can be compared with a corresponding specification of this component.

For example, the status of the component may be a use time of burner. The corresponding specification of the component of the appliance is a maximum burn time of the burner of the heating device.

For example, an appliance error is representative for the appliance not providing heat. This appliance error may be predicted by means of storing the appliance data over time, for example appliance data representative for the use time of a burner.

If the use time of a burner is approaching the maximum use time of the burner, a prediction of the appliance error can be generated by the thermostat. For example, the prediction of the appliance error indicates a predicted time until the error will occur, together with an indication of the type of error. In this example, the prediction of the appliance error indicates as type of error that no heat shall be provided due to an end time of the burner and that this is predicted to occur in a time which is equal to the maximum use time of the burner minus the actual use time of the burner.

In a further example, the maximum use time of the burner is predefined as reference appliance data in the database. This database may be provided in the thermostat, but alternatively or complementary may be stored in the remote maintenance server and/or remote controller.

In a further embodiment, maximum use times of components of the appliance are stored as reference appliance data in the database. The database may be provided in the thermostat and/or can remotely accessed in the remote maintenance server and/or remote controller.

This has as advantage that for each or at least many of the component of the appliance a prediction of a time to failure can be made. A maintenance person may then be able to bring a minimum of components to the appliance in case of servicing. Only the components that are predicted to fail within a certain minimum time can be brought towards the appliance. This is more efficient and reduces costs.

In another example, the appliance comprises sensors, e.g. pressure sensors, temperature sensors and/or flow sensors, generating appliance sensor data. Based on the appliance sensor data a prediction of an appliance error can be generated by the thermostat. The appliance sensor data is representative for a status of the appliance. For example, the appliance sensor data is representative for a water leakage occurring in the appliance. The sensor in this case may for example be one or more flow sensors and/or pressure sensors placed in a water outlet and/or water inlet of the appliance.

This has as advantage that by means of placing sensors the prediction of the appliance error can be even more accurate and can be designed and/or chosen depending on the type of sensors.

Other sensors for example are pressure sensors, density sensors, temperature sensors, flow sensors or any other sensors able to measure a status of the appliance.

The appliance sensor data may be comprised in the appliance data sent towards the thermostat. The appliance sensor data is stored over time or the appliance sensor data is comprised in the appliance data which in turn is stored over time.

In a further embodiment, the appliance is continuously sending the appliance data towards the thermostat.

In an alternative embodiment, the components of which reference appliance data in the database is present is for example:
 a pump in the appliance;
 a fan in the appliance;
 an ignition system in the appliance;
 a burner in the appliance;
 a heat exchanger in the appliance;
 casing/housing in the appliance;
 control electronics in the appliance;
 battery in the appliance;
 power supply in the appliance;
 heat reservoir in the appliance
 hot water storage in the appliance;
 exhaust means in the appliance.
 three-way valve in the appliance.

For example, reference appliance data is present in the database that is representative for (flue gas) temperature, on/off status, voltage, in/out status, pressure and/or flow of or in a respective component.

In a further example, the database comprises reference appliance data representative for flue gas temperature in an exhaust means of the appliance.

In another example, the database comprises reference appliance data representative for a temperature and/or a presence of power supply voltage and/or rotational speed of a fan in the appliance.

In another example, the database comprises reference appliance data representative of whether water is flowing in or out in a hot water storage in the appliance.

In another example, the database comprises reference appliance data representative of whether a pump is on or off in a pump in the appliance.

In another example, the database comprises reference appliance data representative of an inlet temperature and/or an outlet temperature in a heat exchanger in the appliance.

In another embodiment, reference appliance data of a first component is updated depending on stored appliance data of a second component.

For example, the reference appliance data belonging to a pump, burner and fan all depend on a pump modulation level of the pump.

In another example, the reference appliance data belonging to e.g. an exhaust means and/or heat reservoir depend on a setting of a three-way valve. The three-way valve controls whether heated water is used as tap water or water for heating a radiator. The setting of the three-way valve is representative for how much time heated water is used for tap water or heating the radiator respectively. This directly has impact on a life time/use time of other components in the appliance, such as, but not limited to the exhaust means and the heat reservoir.

Above prediction of the appliance error increases reliability of the thermostat, provides more comfort to the user and allows the maintenance person to plan a service or maintenance visit before there is an actual error.

The predicted appliance error can be sent to the user and/or the maintenance person. Preferably, the predicted appliance error is sent to the maintenance person according to a third aspect of the invention, described directly below.

The predicted appliance error is preferably representative for an end of life and/or a need for a service request and/or a need for a maintenance request of the appliance and/or a component of that appliance.

The invention, according to the second aspect, may also relate to a thermostat system comprising a thermostat according to any embodiment and the remote controller and/or the remote maintenance server and/or the at least one appliance.

In an embodiment, the thermostat system comprises the remote maintenance server. The remote maintenance server is configured to provide services upon request, including monitoring, diagnostics, time, mail, notification, adaptive control, logger, updater, upgrade and weather services. The remote controller and/or thermostat are configured to access these services. Preferably, the services are accessed by means of a message distribution centre comprised in the remote maintenance server.

Sending Notification to Maintenance Person Via Remote Controller

In an embodiment, according to a third aspect of the invention, the thermostat is configured for receiving an appliance error from the at least one appliance. The thermostat is configured for generating a service request and/or a maintenance request.

When the appliance changes e.g. into a locking or blocking status the appliance generates the appliance error. Preferably, the appliance error comprises a code representative for a certain locking or blocking error. The thermostat is configured for receiving this appliance error.

When the thermostat determines that it is time for servicing the appliance, the service request is generated to be sent to the remote controller. The service request is representative for a certain servicing that has to be performed on the appliance by an appliance expert. The appliance expert may for example be the maintenance person or it may be a service person responsible for the thermostat of that particular user. In a preference, the thermostat is configured for generating the service and/or maintenance request based on a received appliance error from the at least one appliance.

When the thermostat determines that is time for maintaining the appliance, the maintenance request is generated to be sent to the remote controller. The maintenance request is representative for a certain maintaining that is allowed to be performed by the user. An appliance expert is not mandatory for maintaining the appliance, however the appliance error is capable of performing the maintaining.

Distinguishing between servicing and maintaining is advantageous as it allows the user and the maintenance person to assess whether one or both of them need to start an action.

The thermostat is configured for sending a push notification to the remote controller in response to the received appliance error and/or the generated service request and/or maintenance request.

The appliance error and/or the generated service and/or maintenance request is comprised the push notification and pushed to the remote controller, preferably through the remote maintenance server. Preferably, the remote maintenance server comprises a message distribution centre, such as an XMPP server. The message distribution centre only distributes the error or request from the thermostat to the remote controller.

Preferably, the thermostat is configured for sending the push notification to the remote controller through the remote maintenance server.

This has as advantage that the user who is operating the remote controller may receive push notification from any location as long there is a connection with the remote maintenance server. The remote controller does not necessarily has to be close to the thermostat. Close is defined within a house in which the thermostat is installed. Therefore, it allows the user to receive push notifications and therefore appliance errors even when he is outside the house.

The thermostat is configured for generating status information and for sending the status information to the remote controller.

Status information for example is representative for a type of error and/or a corresponding possible solution and/or a history log file of appliance data.

This has as advantage, that the user does not have to check whether the thermostat and/or appliance requires maintenance. The thermostat and/or the appliance generates respectively the service/maintenance request and/or the appliance error. This data may be comprised in the remote controller data sent from the thermostat to the remote controller in the form of a push notification, preferably through the remote maintenance server. Moreover, the status information may provide the user with information about which action he or she has to take.

In a further embodiment, the status information is sent together with the push notification. The push notification is accompanied with the status information representing a status of the appliance and/or the thermostat. For example, the status information comprises a history log and/or information concerning the appliance and/or information about the error and/or information about the user.

This is advantageous as the user now does not have to investigate the thermostat and/or appliance himself as this now is performed automatically, i.e. the status information is recovered or requested from the appliance and/or thermostat.

This increases a situational awareness of the user who may now more easily decide whether to contact the maintenance person, when an appliance error and/or service/maintenance issue occurs.

In a further embodiment, the controller user interface is configured for transferring the received status information to the maintenance person in response to an input by the user on the controller user interface.

This has as advantage that the user may contact the maintenance user even when the user is not at home. For example, hey may send the push notification with the status information by e-mail to the remote maintenance server.

This enables the maintenance person to quickly react en prepare a visit to the user more adequately as he is provided with the status information about the appliance error and/or service/maintenance request.

The invention, according to the third aspect, may also relate to a thermostat system comprising a thermostat according to any embodiment and the remote controller and/or the remote maintenance server and/or the at least one appliance.

Push Notification from an HVAC Via the Thermostat Wherein the Remote Controller Generates a Request for Status Information In an even further embodiment, according to a fourth aspect of the invention, the thermostat is configured for receiving a request for status information originated by the remote controller, wherein the thermostat is further configured for generating the status information, in response to the request for status information, and send the status information to the remote controller.

In particular, the thermostat is configured for requesting the status information from the remote maintenance server and/or the at least one appliance and after receiving the status information sends the status information to the remote controller.

An initial request for status information is originated by the remote controller. Status information is representative for a status of the appliance. For example, the status information may comprise a history log from the at least one appliance.

In another example, the status information comprises a solution for an appliance error and the thermostat sends a request for this type of status information to the remote maintenance server.

In another example, the thermostat is configured for requesting status information from the remote maintenance server that provides certain services. Examples of such services are a weather service and/or a time service. These services are comprised in the remote maintenance server and/or the remote maintenance server distributes the requests to said services.

On request from the thermostat the remote maintenance server may provide status information regarding the weather from the weather service. Knowing the weather may provide a better solution to a certain appliance error.

On request from the thermostat the remote maintenance server may provide status information regarding an accurate time from the time service. Knowing the time more accurately may provide a better solution to a certain appliance error.

The at least one appliance can be any one or more heating, ventilation and/or air conditioning (HVAC) systems.

Preferably, originated requests are generated in response to a received maintenance and/or servicing request and/or appliance error.

This is advantageous as it prevents a frozen appliance as the maintenance and/or service request is generated before the appliance is frozen.

The thermostat is further configured for adding status information, in response to the request for status information, to the remote controller data.

This is advantageous as it allows the remote controller, and thereby the user, to request all needed information from the appliance via the thermostat. The remote controller, upon receiving the requested status information, generates a message for the user and a detailed report which can be send to the remote maintenance server and/or any person by means of for example e-mail. The any person preferably is a thermostat supplier and/or installer of the appliance and/or the maintenance person.

The status information, for example, comprises a history log and/or information concerning the appliance and/or information about the error and/or information about the user. The detailed report send to the remote maintenance server and/or any person comprises at least the status information.

This is advantageous as with the status information the service/maintenance request and or appliance error can be solved in the most efficient way. The intervention from the user is moreover minimized.

Preferably, the sending of the detailed report to the remote maintenance server and/or any person is performed automatically, i.e. without intervention of the user, however through the remote controller.

This is advantageous, as the user normally has little knowledge of the appliance.

Above decreases the amount of service costs.

Preferably, the remote controller is configured for requesting the status information through the remote maintenance server.

This allows the user, who controls the remote controller, to request status information even when he is not close to the thermostat. The remote controller is connected, e.g. by internet, with the remote maintenance server. The remote maintenance server is connected, e.g. by internet, with the thermostat.

Preferably, the thermostat is configured to send the status information to the remote controller trough the remote maintenance server.

This allows the user, who controls the remote controller, to receive status information, even when he is not close to the thermostat. Again, the remote controller is connected, e.g. by internet, with the remote maintenance server. The remote maintenance server is connected, e.g. by internet, with the thermostat.

The invention, according to the fourth aspect, may also relate to a thermostat system comprising a thermostat according to any embodiment and the remote controller and/or the remote maintenance server and/or the at least one appliance.

Remote Reset of at Least One Appliance in Case of an Appliance Error

In an embodiment, according to a fifth aspect of the invention, the thermostat is configured for distributing a reset instruction to the at least one appliance in response to a received reset instruction from the remote maintenance server.

This is advantageous as it allows a maintenance person to generate a remote reset as long as he is in contact with the remote maintenance server. For example, the maintenance server directly generates a reset instruction on the remote maintenance server through the maintenance service interface. In another example, the maintenance person accesses the remote controller and generates a reset instruction which is sent to the thermostat through the remote maintenance server, which is e.g. a message distribution centre, e.g. a XMPP server.

The thermostat is further configured for delaying the distribution of the reset instructions by a predetermined amount of time.

This is advantageous as it complies with legal specifications that specify that a reset instruction must be ignored when a previous reset instruction was sent to the appliance within an amount of time, e.g. 20 minutes.

The invention, according to the fifth aspect, may also relate to a thermostat system comprising a thermostat according to any embodiment and the remote controller and/or the remote maintenance server and/or the at least one appliance.

Thermostat as Gateway for Access to at Least One Appliance

In an embodiment, according to a sixth aspect of the invention, the thermostat further comprises a gateway configured for distributing appliance data between the at least one appliance and the remote controller.

The gateway is configured to communicate with the appliance. For example, the appliance is a boiler comprising a bus. The gateway wirelessly or by wire communicates with the bus. The gateway is also configured to communicate appliance data to a remote controller. The remote controller is controlled by a maintenance or service person who visits a house in which the thermostat is placed. The gateway distributes appliance data from the appliance to the remote controller.

This gateway is a separate from the thermostat and only accessible by an installer and/or maintenance/service person and not the user. For example, the gateway can only be activated by means of a password on the remote controller or the maintenance person has its own remote controller which automatically has access to all gateways in different thermostat placed at different users.

This is advantageous as it allows a more convenient service tool or even obsoletes a service tool as the remote controller of the user can be used. Moreover, it is not mandatory anymore to have a service tool to be physically connected to the appliance to extract appliance data. Instead, the appliance data can be acquired remotely, through the gateway.

Preferably, the gateway is configured to communicate with the appliance and the remote controller by means of Wi-Fi.

Preferably, the gateway is housed separately from the thermostat, e.g. outside the housing of the thermostat.

The appliance data is preferably any system information or any information provided and accessible by a bus of the appliance. For example, the appliance data is representative for pump parameters, fan parameters, boiler parameters, modulation level parameters, modulation curves and other settings.

The invention, according to the sixth aspect, may also relate to a thermostat system comprising a thermostat according to any embodiment and the remote controller and/or the remote maintenance server and/or the at least one appliance.

In another embodiment, according to a seventh aspect of the invention, the thermostat is further configured for distributing appliance data between the at least one appliance and the remote controller through the remote maintenance server.

The remote maintenance server preferably is a message distribution centre, e.g. a XMPP server, which distributes appliance data from the appliance to the remote controller, through the thermostat.

This is advantageous as on the one hand a diagnosis by the installer and/or the maintenance person can be done without entering the premises of the user or at least the premises of the at least one appliance of the user. The installer and/or maintenance person having the remote controller can be anywhere, as long he has access to the remote maintenance server, e.g. by Internet. On the other the privacy of the user can be protected.

The invention, according to the seventh aspect, may also relate to a thermostat system comprising a thermostat according to any embodiment and the remote controller and/or the remote maintenance server and/or the at least one appliance.

In above embodiments only one appliance, or the at least one appliance, is mentioned. It is foreseen that more than one appliance can be communicating with the thermostat. Also, different types of appliances can concurrently communicate with a single thermostat and benefit from the advantages mentioned above.

It will be understood that the various aspects of the invention may be combined into a same thermostat, however each of the disclosed aspects may be implemented as such, i.e. without implementing other aspects of the invention in the same thermostat.

It will be understood that the invention primarily relates to a thermostat according to any aspect of the invention. However, it is foreseen that a thermostat system also comprises the remote controller and/or the remote maintenance server and/or the at least one appliance.

The invention thus also relates to a thermostat system, comprising a thermostat according to one of the above embodiments and wherein the thermostat system further comprises the remote controller and/or the remote maintenance server and/or the at least one appliance according to one of the preceding claims.

In an embodiment the remote maintenance server is a remote maintenance service. The remote maintenance service may be provided on the remote maintenance server that is a dedicated hardware server. In an alternative the remote maintenance service is provided in the cloud and/or on multiple hardware servers.

The invention will further be explained in the context of the appended drawing and corresponding description, in which a non-limiting embodiment of the invention is disclosed, wherein:

FIG. 1 depicts a block schematic overview of a thermostat comprising a thermostat able to request appliance data according to a first embodiment of the invention FIG. 2 depicts a block schematic overview of a thermostat according to a second embodiment of the invention;

FIG. 3 depicts a block schematic overview of a thermostat according to a third embodiment of the invention; and FIG. 4 depicts a block schematic overview of a thermostat according to a fourth embodiment of the invention; and FIG. 5 depicts a block schematic overview of a thermostat according to a fifth embodiment of the invention; and FIG. 6 depicts a block schematic overview of a thermostat according to a sixth embodiment of the invention.

Figure 1:
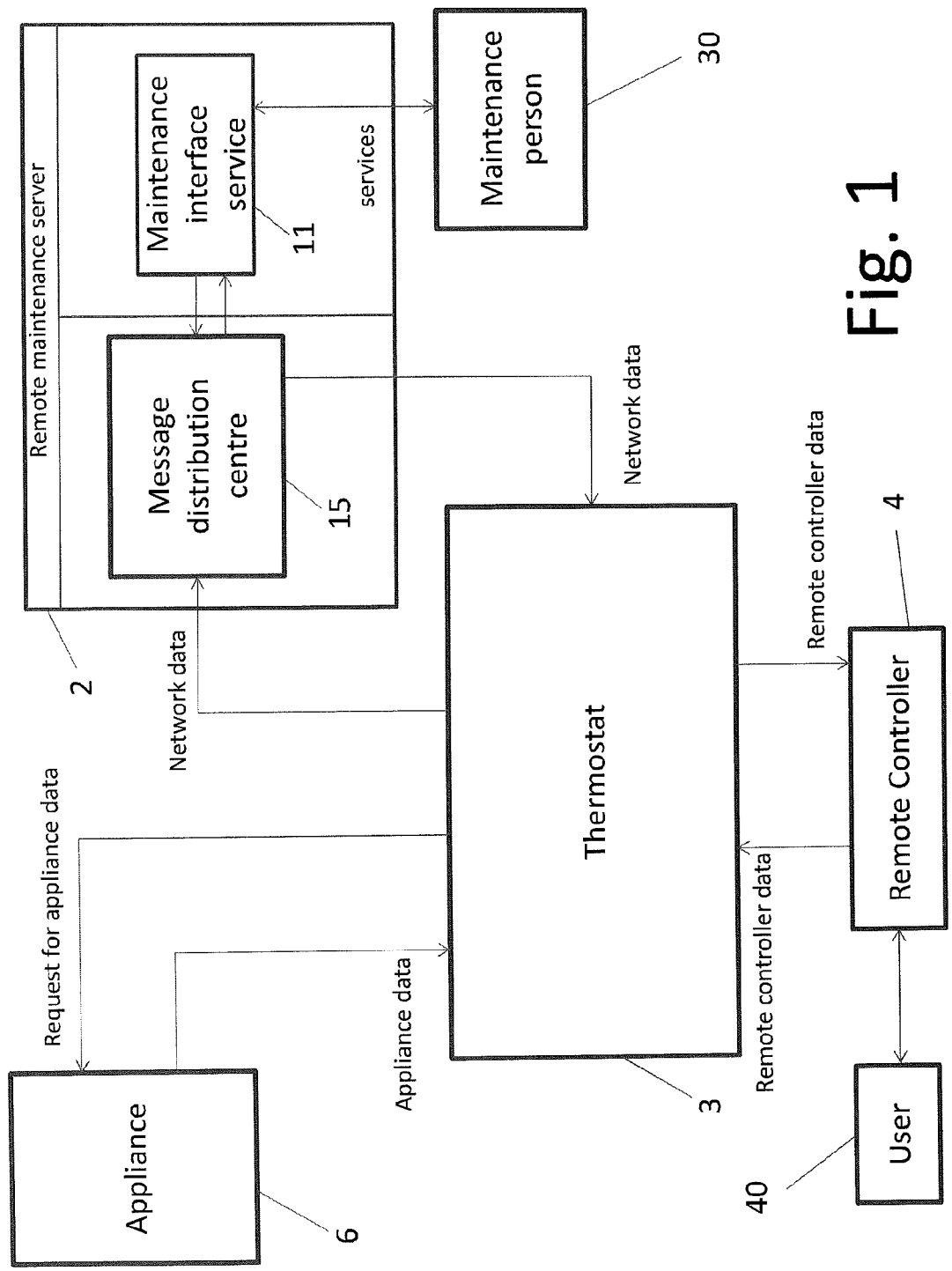
FIG. 1 shows a block schematic overview of a thermostat comprising a thermostat able to request appliance data according to a first embodiment of the invention.

Shown is a thermostat 3 for communicating with a remote maintenance server 2.

The thermostat 3 is being configured for receiving and sending network data 10 from and to the remote maintenance server 2. The thermostat is configured to receive network data 10 provided by a maintenance interface service 11 for receiving and displaying network data 10 from and to a maintenance person 30.

Network data 10 is defined as data transferred two-way between the thermostat 3 and the remote maintenance server 2. Network data may comprise any type of data which is explained in more detail in the description of the different embodiments of the invention.

Preferably, the remote maintenance server 2 comprises a message distribution centre 15, e.g. a XMPP server. The message distribution centre receives network data 10 from a first entity, such as a thermostat 3 and distributes this to another entity. This other entity may for example be the maintenance interface service 11. In particular, the message distribution centre 15 connects with all types of services. Here, only the maintenance interface service 11 is shown, however services may also include a weather service, time service, mail service and/or update service.

In a further embodiment, a thermostat system is foreseen comprising the thermostat 3 and the remote maintenance server 2.

The thermostat 3 is further configured for receiving and sending remote controller data 20 from and to a remote controller 4. The thermostat 3 is configured to receive remote controller data 20 from a user 40 through a controller user interface 21. The controller user interface 21 is configured for receiving and displaying remote controller data 20 from and to the user 40.

In a further embodiment, a thermostat system is foreseen comprising the thermostat 3 and the remote controller 4.

The thermostat 3 is further configured for receiving and sending appliance data 50 from and to at least one appliance 6. The at least one appliance 6 is configured for receiving and sending appliance data 50 from and to the thermostat 3.

In a further embodiment, a thermostat system is foreseen comprising the thermostat 3 and the appliance 6.

The appliance 6 preferably is a domestic heating device of a domestic heating system such as a central heating system comprising a boiler. Such central heating system provides heated liquid medium to a radiator and/or provides heated tap water. Alternatively, the appliance 6 may be and heating, ventilation and air conditioning (HVAC) system.

The thermostat 3 is configured for generating a request for appliance data 51 from the at least one appliance 6 and the thermostat 3 is configured for receiving appliance data 50 in response to the request for appliance data 51.

This has as advantage that the user 40 of the thermostat 3 and/or the maintenance person 30 is able to see appliance data 50 upon request. The user 40 may for example generate the request for appliance data 51 through the remote controller 4 by means of the controller user interface 21. The thermostat 3 sends, or redirects, this request 51 to the at least one appliance 6. Upon receiving this request 51 the at least one appliance 6 sends the appliance data 50 to the thermostat 3. Having the requested appliance data 50 in the thermostat 3 allows an easy access of this appliance data by the user 40 and/or the maintenance person 30.

Figure 2:
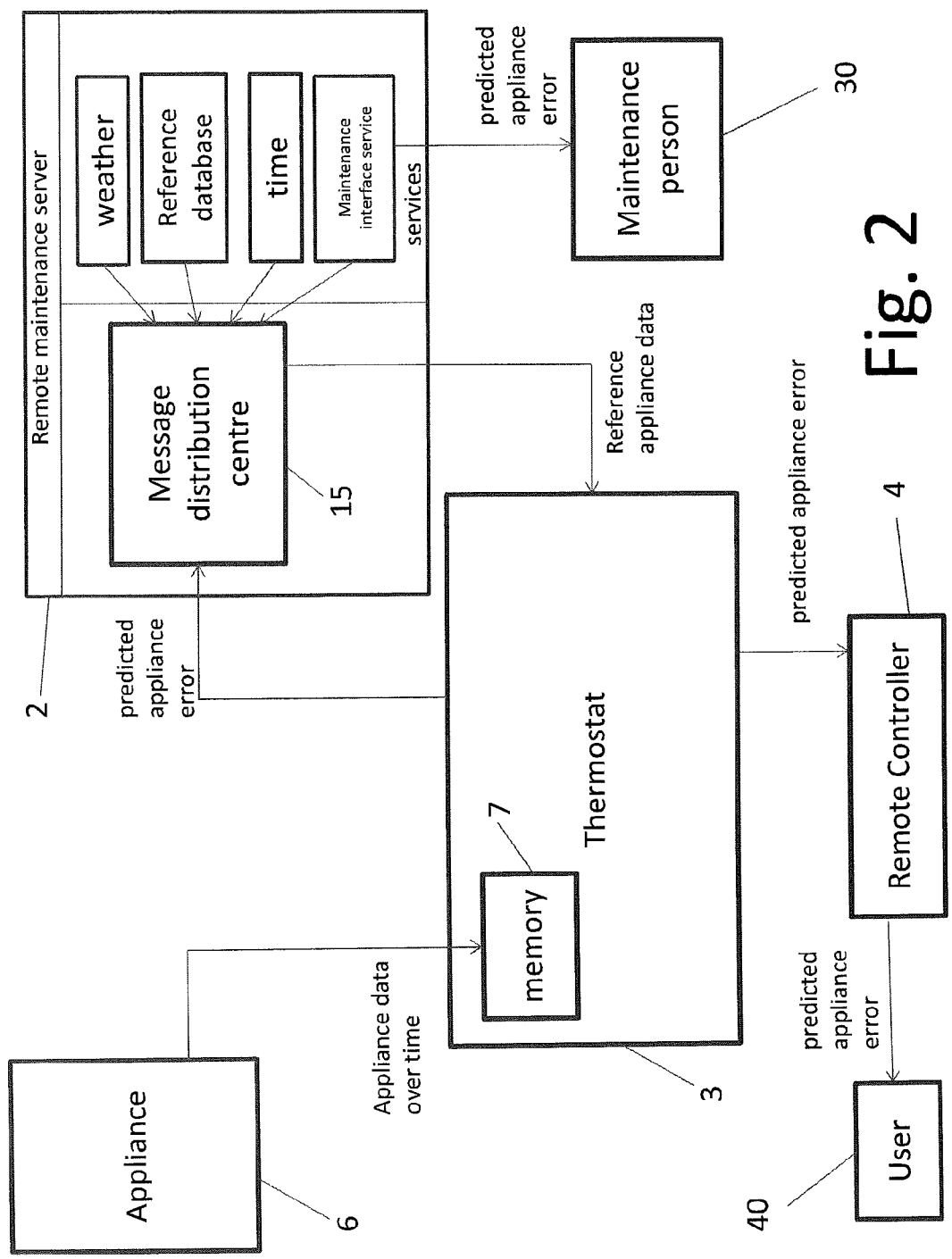

FIG. 2 shows a block schematic overview of a thermostat comprising preventive maintenance, e.g. generating a prediction of appliance error, according to a second embodiment of the invention.

The features discloses in the first embodiment are also comprised in the second embodiment. Note, that the definition of appliance data 50, network data 10 and/or remote controller data 20 is not repeated, however it is understood that new definitions of data below are to be comprised in the appliance data 50 and/or network data 10 and/or remote controller data 20, depending on between what entities the newly defined data are communicated/distributed.

The thermostat 3 is configured for storing the appliance data 50 over time and for predicting an appliance error 60 by comparing the stored appliance data 50 over time with reference appliance data 55. The predicted appliance error 61 may be sent to the remote controller 4 and/or the remote maintenance server 2.

The stored appliance data 50 over time comprises data representative for a status of the appliance 6 over time. The appliance data 50 is for example representative for a burn time of a burner in case the appliance 6 is a boiler.

Here, the thermostat 3 is configured for receiving the reference appliance data 50 from the remote maintenance server 2. However, the reference appliance data 50 may also be stored or provided by the remote controller 4 and/or the thermostat 3.

The appliance data 50 over time is preferably stored within the thermostat 3 in a memory 7. The memory 7 may alternatively be located in the remote controller 4 or is stored in or provided by the remote maintenance server 2 by means of a memory service.

The stored appliance data 50 is representative for a current status of a component of the appliance 6 and the database comprises reference appliance data 51 representative for a specification of the component of the appliance.

The component may for example be a burner in the appliance 6. The appliance in this case may for example be a boiler. The specification may for example be a time of burning. When for the burner a maximum time of burning is known, this is stored in the reference application data 51. The thermostat 3 is configured for comparing the actual burning time with the maximum burning time and generates a prediction error when those two times become to close. For example, it notifies the user 40 and/or the maintenance person 30 that the burner reaches an end of life.

In a further embodiment, the reference appliance data 51 is updated and/or filled based on experience from a maintenance person 30 and/or factory settings and/or appliance data 50 from other appliances 6.

In another embodiment, the reference appliance data 51 is updated and/or filled based on appliance data 50 received from other appliances through other thermostats (not shown here).

In another embodiment, the at least one appliance 6 comprises at least one sensor (not shown here) for generating appliance sensor data representative for a status of the appliance, wherein the appliance sensor data is compared with reference appliance data for predicting an appliance error.

The appliance sensor data may be comprised in the application data 50.

Figure 3:
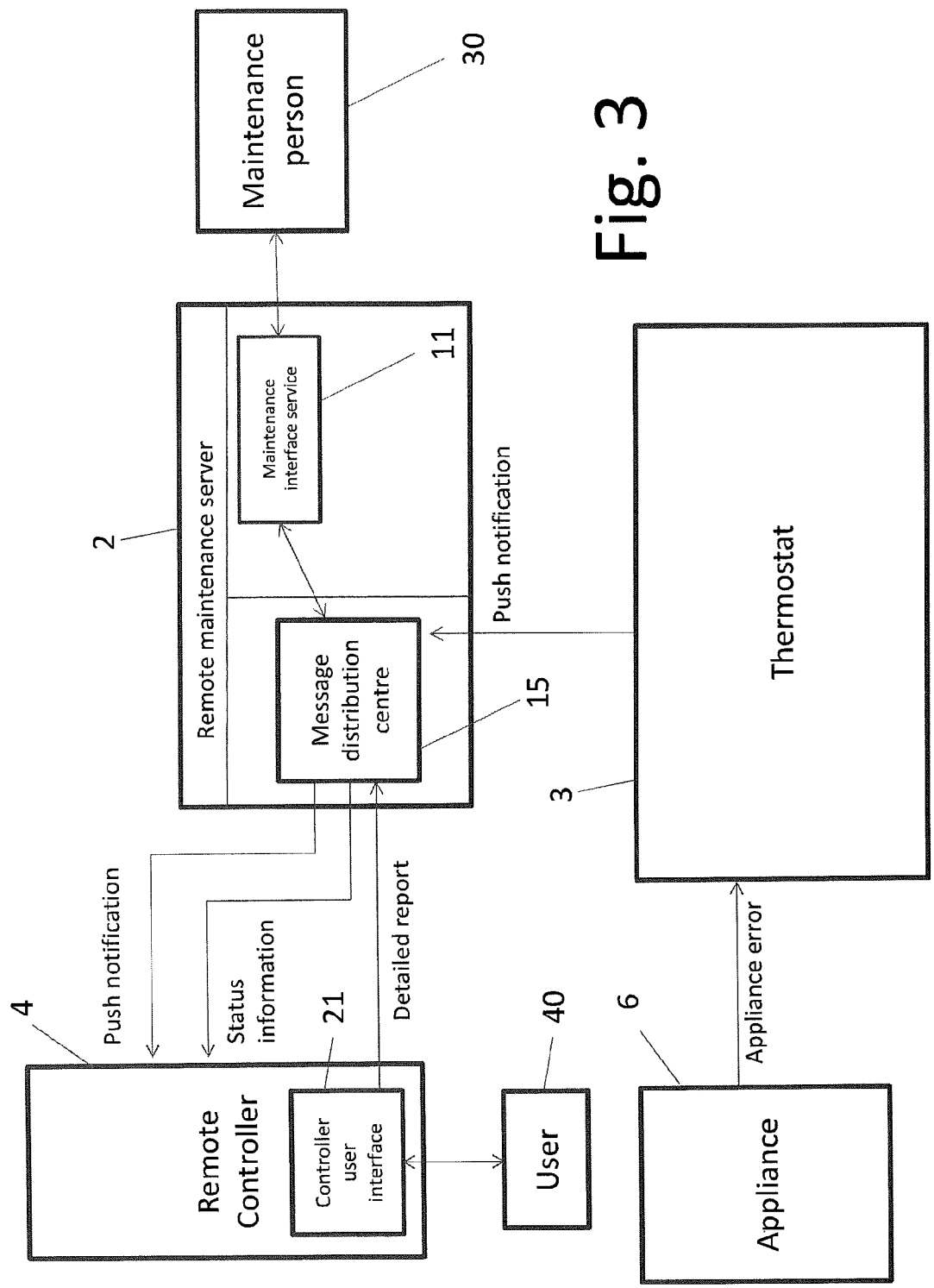

FIG. 3 shows a block schematic overview of a thermostat 3 configured for sending a push notification 35 to a maintenance person 30 via a remote controller 4.

The features discloses in the first embodiment are also comprised in the third embodiment. Note, that the definition of appliance data 50, network data 10 and/or remote controller data 20 is not repeated, however it is understood that new definitions of data below are to be comprised in the appliance data 50 and/or network data 10 and/or remote controller data 20, depending on between what entities the newly defined data are communicated/distributed.

Shown is a thermostat 3 configured for receiving an appliance error 60 from the at least one appliance 6 and the thermostat 3 is configured for generating a service request 36 and/or a maintenance request 37.

The service request is defined as a request to an appliance expert such as the maintenance person 30 and relate to servicing that is not allowed to be performed by the user 40.

The maintenance request is defined as a request to the user for maintaining the appliance 6 which relate to operations allowed to be performed by the user 40.

The thermostat 3 is configured for sending a push notification 35 to the remote controller 3, in response to the received appliance error 60 and/or the generated service request 36 and/or maintenance request 37. The appliance error 60 and/or service request 36 and/or maintenance request 37 is comprised in the push notification.

The thermostat is further configured for generating status information 38, and for sending the status information 38 to the remote controller 4.

Preferably, the thermostat 3 is configured for sending the push notification 35 to the remote controller 3 through the remote maintenance server 2.

The remote maintenance server 2 comprises the message distribution centre 15 which distributes the push notification 35 to the remote controller 4. This allows the remote controller 4 to be anywhere, not necessarily near the thermostat 3, as long there is a connection between the remote controller 4 and the remote maintenance server 2 on the one hand and a connection between the thermostat 3 and the remote maintenance server 2 on the other hand.

The controller user interface 21 is configured for transferring the received status information 38 to the maintenance person 40 in response to an input by the user 30 on the controller user interface 21.

Preferably, the controller user interface 21 sends a detailed report 62 to the maintenance person 40. The detailed report 62 is send to the remote maintenance server 2 and the message distribution centre 15 distributes the detailed report to the maintenance interface service 11.

In a further embodiment, the thermostat is further configured for sending the status information 38 together with the push notification 35.

Figure 4:
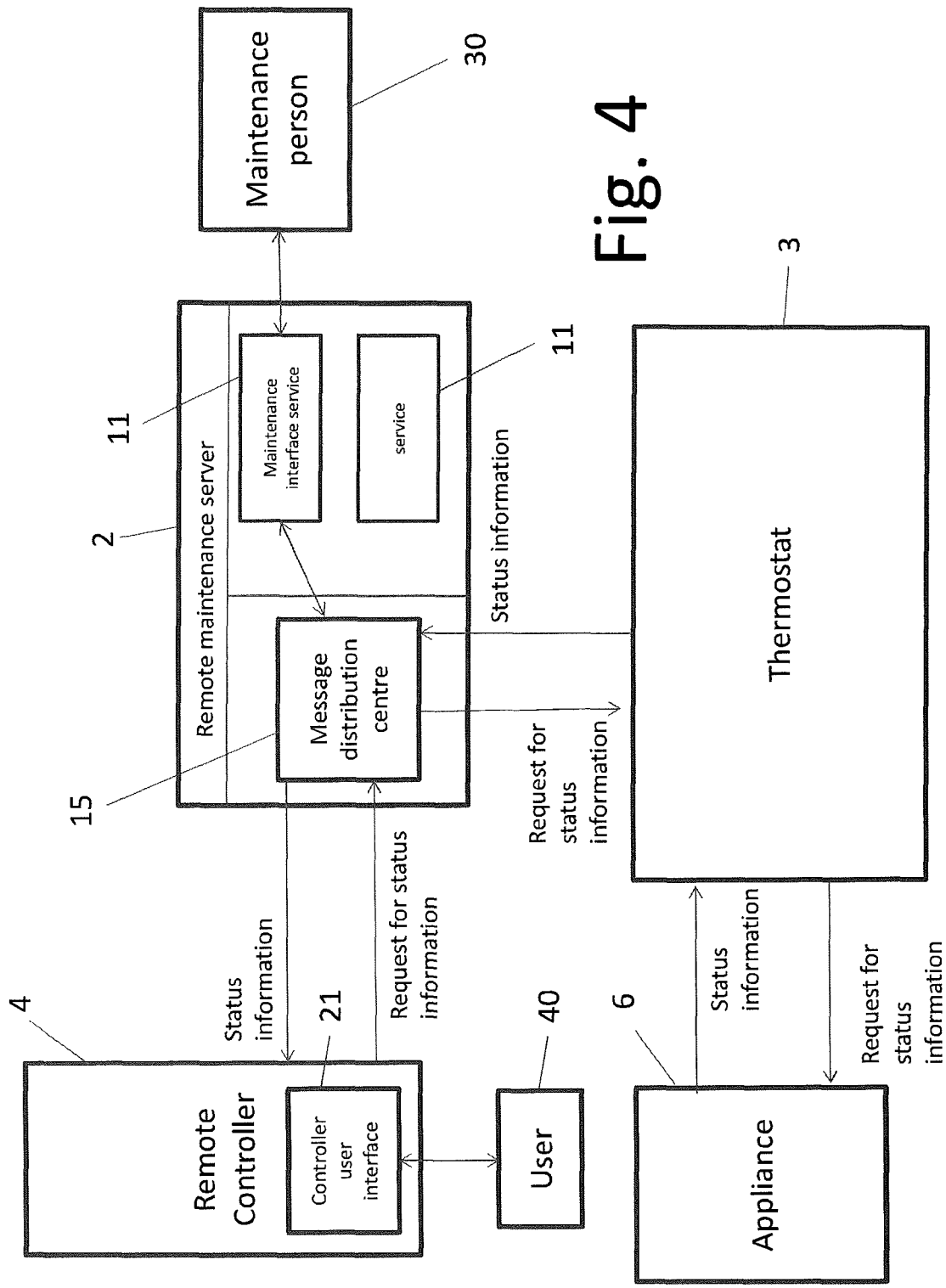

However, in another embodiment, the thermostat may request sequentially for status information 38, which is shown in more detail in FIG. 4.

FIG. 4 shows a block schematic overview of a thermostat 3 configured for generating a push notification 35 from an appliance 6 via the remote controller 4 to generate a service request 36.

The features discloses in the first embodiment are also comprised in the fourth embodiment. Note, that the definition of appliance data 50, network data 10 and/or remote controller data 20 is not repeated, however it is understood that new definitions of data below are to be comprised in the appliance data 50 and/or network data 10 and/or remote controller data 20, depending on between what entities the newly defined data are communicated/distributed.

Although not necessary, the features disclosed in the third embodiment are also comprised in the fourth embodiment.

Here, the thermostat 3 is configured for receiving a request for status information 39 originated by the remote controller 4. When the push notification 35 is received by the remote controller 4, a request for status information 39 is originated by the remote controller 4.

The thermostat 3 is further configured for generating the status information 38, in response to the request for status information 39. The thermostat 3 is configured to send the status information 38 to the remote controller 4.

For example, the push notification 4 comprises an error code according to a predefined protocol. Upon receipt of this error code the remote controller 4 requests the thermostat 3 for status information 39. This status information 39 may for example be comprising an actual error or a solution to this error that corresponds with the error code. The thermostat 3 in its turn requests the status information from the appliance 6 and/or the remote maintenance server 2. For the latter, the thermostat 3 is configured for requesting status information from a service provided by the remote maintenance server 2.

In a preference, the thermostat 3 is configured for receiving a request for the status information 39 from the remote maintenance server 2 wherein the request for the status information 39 is originated by the remote controller 4. In other words, the remote controller 4 sends the request for status information 39 through the remote maintenance server 2.

This has as advantage that the remote controller 4 may be located anywhere as long as there is a connection with the remote maintenance server 2. This is more friendly to the user 40.

In a further preference, the thermostat 3 is configured to send the status information 38 to the remote controller 4 through the remote maintenance server 2.

The request for status information 39 is in response to a received maintenance request 37 and/or service request 36 and/or appliance error 60 or a predicted appliance error 61.

Figure 5:
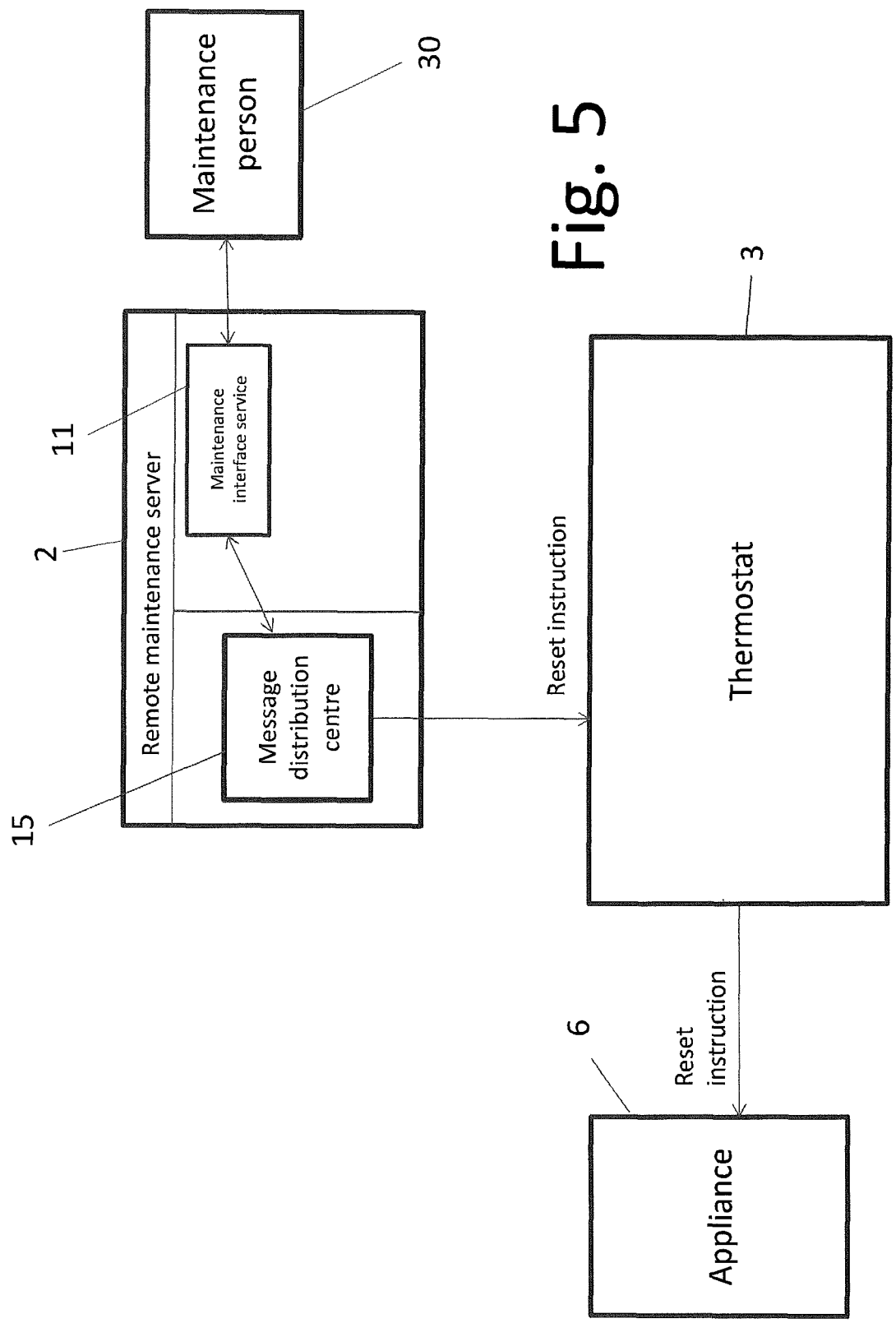

FIG. 5 shows a block schematic overview of a thermostat 3 configured for remotely resetting at least one appliance 6 in case of an appliance error 60.

The features discloses in the first embodiment are also comprised in the fifth embodiment. Note, that the definition of appliance data 50, network data 10 and/or remote controller data 20 is not repeated, however it is understood that new definitions of data below are to be comprised in the appliance data 50 and/or network data 10 and/or remote controller data 20, depending on between what entities the newly defined data are communicated/distributed.

The thermostat 3 is configured for distributing a reset instruction 70 to the at least one appliance 6 in response to a received reset instruction 70 from the remote maintenance server 2.

The thermostat 3 is further configured for delaying the distribution of the reset instruction 70 by a predetermined amount of time.

Figure 6:
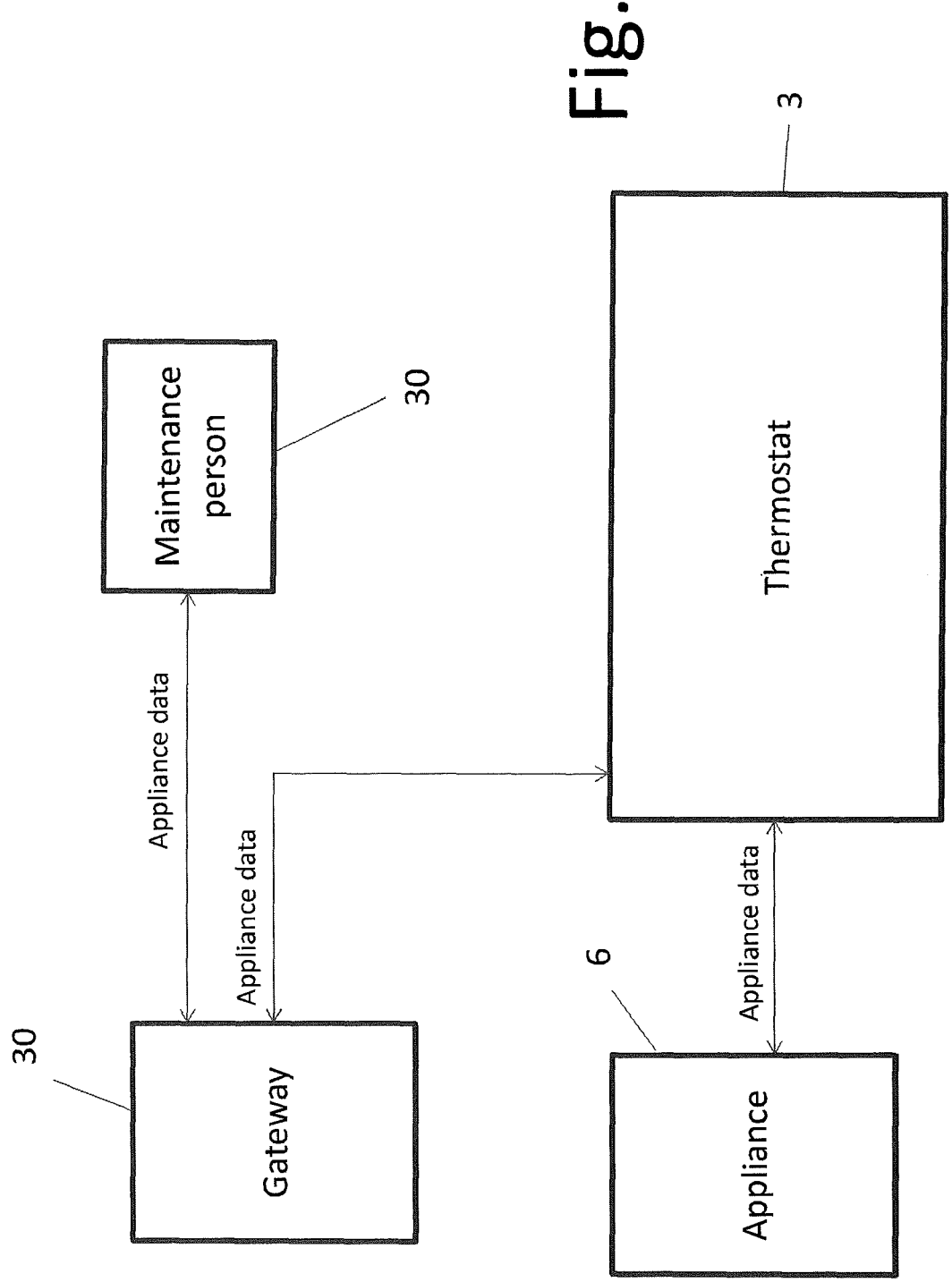

FIG. 6 shows a block schematic overview of a thermostat 3 comprising a gateway 80 for access to at least one appliance 6.

The features discloses in the first embodiment are also comprised in the sixth embodiment. Note, that the definition of appliance data 50, network data 10 and/or remote controller data 20 is not repeated, however it is understood that new definitions of data below are to be comprised in the appliance data 50 and/or network data 10 and/or remote controller data 20, depending on between what entities the newly defined data are communicated/distributed.

The thermostat 3 further comprises a gateway 80 configured for distributing appliance data 50 between the at least one appliance 6 and the remote controller 4.

The gateway 80 is preferably housed separately from the thermostat 3.

Figure 7:
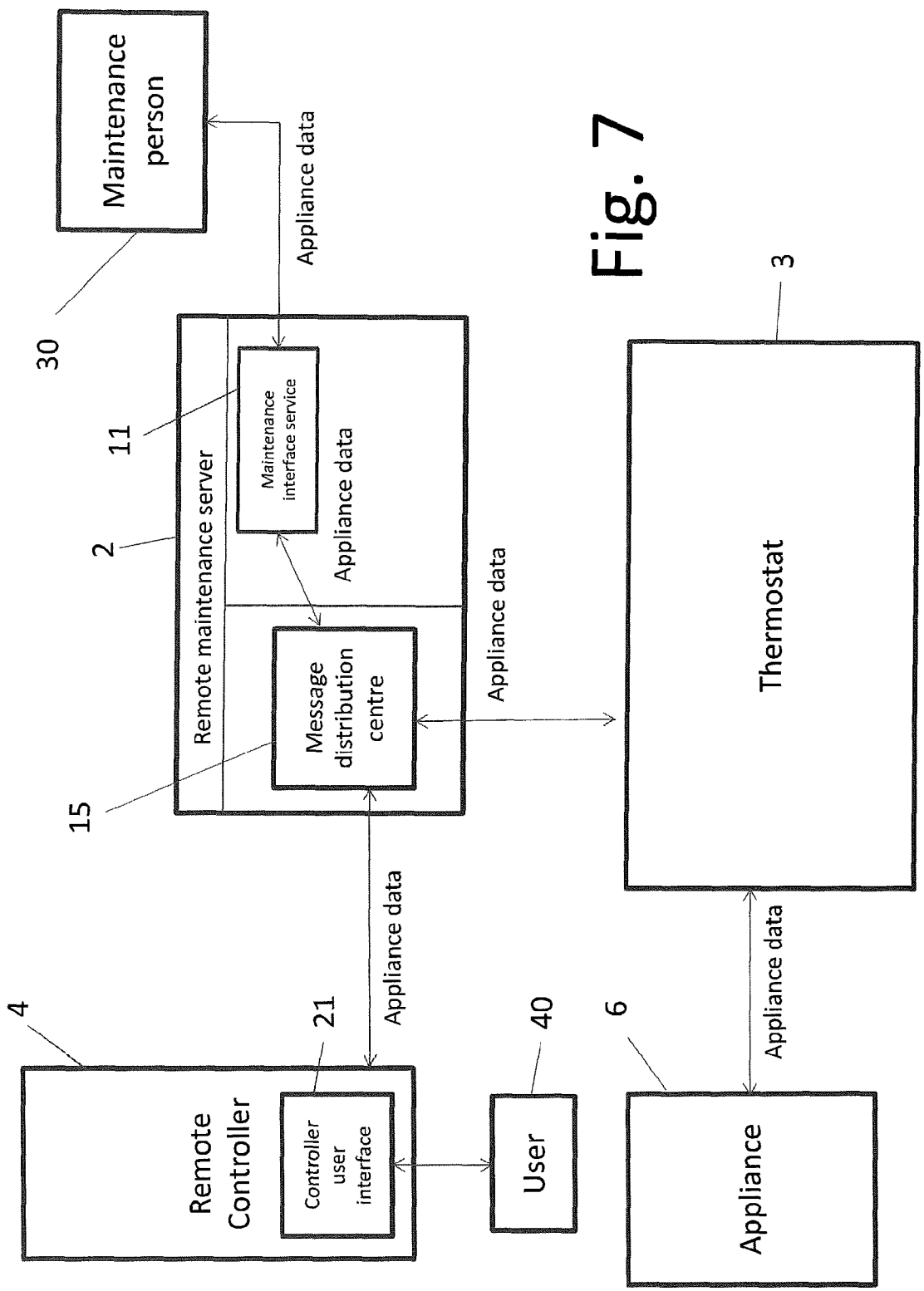
FIG. 7 depicts a block schematic overview of a thermostat according to a seventh embodiment of the invention.

FIG. 7 shows a block schematic overview of a thermostat 3 configured for distributing appliance data 50.

The features discloses in the first embodiment are also comprised in the seventh embodiment. Note, that the definition of appliance data 50, network data 10 and/or remote controller data 20 is not repeated, however it is understood that new definitions of data below are to be comprised in the appliance data 50 and/or network data 10 and/or remote controller data 20, depending on between what entities the newly defined data are communicated/distributed.

The thermostat 3 further is configured for distributing appliance data 50 between the at least one appliance 6 and the remote controller 4 through the remote maintenance server 2.

As required, detailed embodiments of the present invention are disclosed herein; however, it is to be understood that the disclosed embodiments are merely exemplary of the inventions, which can be embodied in various forms. Therefore, specific structural and functional details disclosed herein are not to be interpreted as limiting, but merely as a basis for the claims and as a representative basis for teaching one skilled in the art to variously employ the present invention invent virtually any appropriate detailed arrangement.

Further, the terms and phrases herein are not intended to be limiting, but rather, to provide an understandable description of the invention.

The mere fact that certain features are recited in mutually different dependent claims does not indicate that a combination of these features cannot be used to advantage.

The invention claimed is:

1. A thermostat for communicating with a remote maintenance server,
said thermostat being configured to:
receive and send network data from and to the remote maintenance server;
receive and send remote controller data from and to a remote controller;
receive and send appliance data from and to at least one appliance; and
generate a request for appliance data from the at least one appliance to receive appliance data from the at least one appliance in response to the request for appliance data,
wherein the at least one appliance corresponds to at least one of a heating, ventilation and air conditioning (HVAC) system, a domestic heating device, an air conditioning unit, a ventilation unit, or combinations thereof wherein the thermostat is further configured to store the appliance data over time and to predict an appliance error by comparing the stored appliance data over time with reference appliance data.

2. The thermostat of claim 1, wherein the thermostat is configured for receiving reference appliance data from the remote maintenance server and/or the thermostat and/or the remote controller.

3. The thermostat of claim 2, wherein the appliance data over time is stored within at least one of the thermostat, the remote maintenance server, and the remote controller.

4. The thermostat of claim 2, wherein the stored appliance data over time is compared with reference appliance data stored in a database provided by at least one of the thermostat, the remote maintenance server, and the remote controller.

5. The thermostat of claim 4, wherein the stored appliance data is representative for a current status of a component of the appliance and the database includes reference appliance data representative for a specification of the component of the appliance.

6. The thermostat of claim 2, wherein the reference appliance data (55) is updated and/or filled based on experience from the maintenance person (30) and/or factory settings and/or appliance data from other appliances.

7. The thermostat of claim 6, wherein the reference appliance data is at least one of updated and filled based on appliance data received from other appliances through other thermostats.

8. The thermostat of claim 2, wherein the at least one appliance includes at least one sensor for generating appliance sensor data representative for a status of the appliance, and wherein the appliance sensor data is compared with reference appliance data for predicting an appliance error.

9. The thermostat of claim 1, wherein the thermostat is further configured to receive an appliance error from the at least one appliance, generate at least one of a service request and a maintenance request, send a push notification to the remote controller, in response to at least one of the received appliance error, the generated service request, and the maintenance request, and wherein the thermostat is further configured to generate status information and to send the status information to the remote controller.

10. The thermostat of claim 9, wherein the thermostat is further configured to send the push notification to the remote controller through the remote maintenance server.

11. The thermostat of claim 9, wherein the thermostat is further configured to send the status information together with the push notification.

12. The thermostat of claim 9, wherein a controller user interface is configured to:
receive remote controller data from a user through the controller user interface; and
transfer the received status information to the maintenance person in response to an input by the user on the controller user interface.

13. The thermostat of claim 1, wherein the thermostat is further configured to receive a request for status information originated by the remote controller, and to generate the status information, in response to the request for status information, and send the status information to the remote controller.

14. The thermostat of claim 13, wherein the thermostat is further configured to receive the request for status information from the remote maintenance server, and wherein the request for status information is originated by the remote controller.

15. The thermostat of claim 13, wherein the thermostat is further configured to send the status information to the remote controller through the remote maintenance server.

16. The thermostat of claim 13, wherein the request for status information is in response to at least one of a received maintenance request, a service request, and an appliance error.

17. The thermostat of claim 1, wherein the thermostat is further configured to distribute a reset instruction to the at least one appliance in response to a received reset instruction from the remote maintenance server.

18. The thermostat of claim 17, wherein the thermostat is further configured to delay the distribution of the reset instruction by a predetermined amount of time.

19. The thermostat of claim 1, wherein the thermostat includes a gateway to distribute appliance data between the at least one appliance and the remote controller.

20. The thermostat of claim 19, wherein the gateway is housed separately from the thermostat.

21. The thermostat of claim 1, wherein the thermostat is further configured to distribute appliance data between the at least one appliance and the remote controller through the remote maintenance server.

22. A thermostat system, comprising:
   a remote controller;
   a remote maintenance server; and
   at least one appliance, wherein the at least one appliance corresponds to at least one of a heating, ventilation and air conditioning (HVAC) system, a domestic heating device, an air conditioning unit, a ventilation unit, or combinations thereof; and
   a thermostat for communicating with the remote maintenance server, said thermostat being configured to:
      receive and send network data from and to the remote maintenance server;
      receive and send remote controller data from and to the remote controller;
      receive and send appliance data from and to the at least one appliance; and
      generate a request for appliance data from the at least one appliance to receive appliance data from the at least one appliance in response to the request for appliance data wherein the thermostat is further configured to store the appliance data over time and predict an appliance error by comparing the stored appliance data over time with reference appliance data.

23. The thermostat system of claim 22, wherein the thermostat is further configured to:
   generate at least one of a service request or a maintenance request in response to a predicted appliance error; and
   send a push notification to the remote controller in response to at least one of the service request or the maintenance request.

24. The thermostat system of claim 23, wherein the thermostat is further configured to:
   send a push notification to the remote controller in response to at least one of the service request or the maintenance request.

25. The thermostat of claim 1, wherein the thermostat is further configured to receive network data provided by a maintenance interface service for receiving and displaying network data from and to a maintenance person.

* * * * *